United States Patent
Landis et al.

(10) Patent No.: US 12,302,122 B2
(45) Date of Patent: May 13, 2025

(54) INTER-FREQUENCY REFERENCE SIGNAL SPATIAL MAPPING

(71) Applicant: QUALCOMM Incorporated, San Diego, CA (US)

(72) Inventors: Shay Landis, Hod Hasharon (IL); Idan Michael Horn, Hod Hasharon (IL); Yehonatan Dallal, Kfar Saba (IL)

(73) Assignee: QUALCOMM Incorporated, San Diego, CA (US)

(*) Notice: Subject to any disclaimer, the term of this patent is extended or adjusted under 35 U.S.C. 154(b) by 423 days.

(21) Appl. No.: 17/811,823

(22) Filed: Jul. 11, 2022

(65) Prior Publication Data

US 2024/0015524 A1    Jan. 11, 2024

(51) Int. Cl.
*H04W 24/10*    (2009.01)
*H04L 5/00*    (2006.01)
*H04W 16/28*    (2009.01)

(52) U.S. Cl.
CPC ........... *H04W 16/28* (2013.01); *H04L 5/0051* (2013.01); *H04W 24/10* (2013.01)

(58) Field of Classification Search
CPC .... H04W 16/28; H04W 24/10; H04L 5/0051; H04B 7/06968; H04B 7/06958
See application file for complete search history.

(56) References Cited

U.S. PATENT DOCUMENTS

| | | |
|---|---|---|
| 2021/0344403 A1 | 11/2021 | Park et al. |
| 2021/0345131 A1* | 11/2021 | Pezeshki ................. G06N 20/00 |
| 2022/0159636 A1* | 5/2022 | Landis .............. H04W 72/0453 |

OTHER PUBLICATIONS

International Search Report and Written Opinion—PCT/US2023/068910—ISA/EPO—Oct. 9, 2023.
Roy D., et al., "Going Beyond RF: How AI-Enabled Multimodal Beamforming will Shape the NextG Standard", arXiv.org, Cornell University Library, 201, Olin Library Cornell University Ithaca, NY 14853, arXiv:2203.16706v1 [eess.SP], Mar. 30, 2022, XP091187434, pp. 1-24, Section V.

* cited by examiner

*Primary Examiner* — Chuong A Ngo
(74) *Attorney, Agent, or Firm* — Harrity & Harrity LLP

(57) ABSTRACT

Various aspects of the present disclosure generally relate to wireless communication. In some aspects, a user equipment (UE) may receive one or more reference signals (RSs) via a beam of a first frequency range, the beam of the first frequency range being associated with a set of beams of a second frequency range. The UE may perform, based at least in part on the one or more RSs, beam management for communication via the second frequency range. Numerous other aspects are described.

30 Claims, 10 Drawing Sheets

INTER-FREQUENCY REFERENCE SIGNAL SPATIAL MAPPING

FIELD OF THE DISCLOSURE

Aspects of the present disclosure generally relate to wireless communication and to techniques and apparatuses for inter-frequency reference signal spatial mapping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
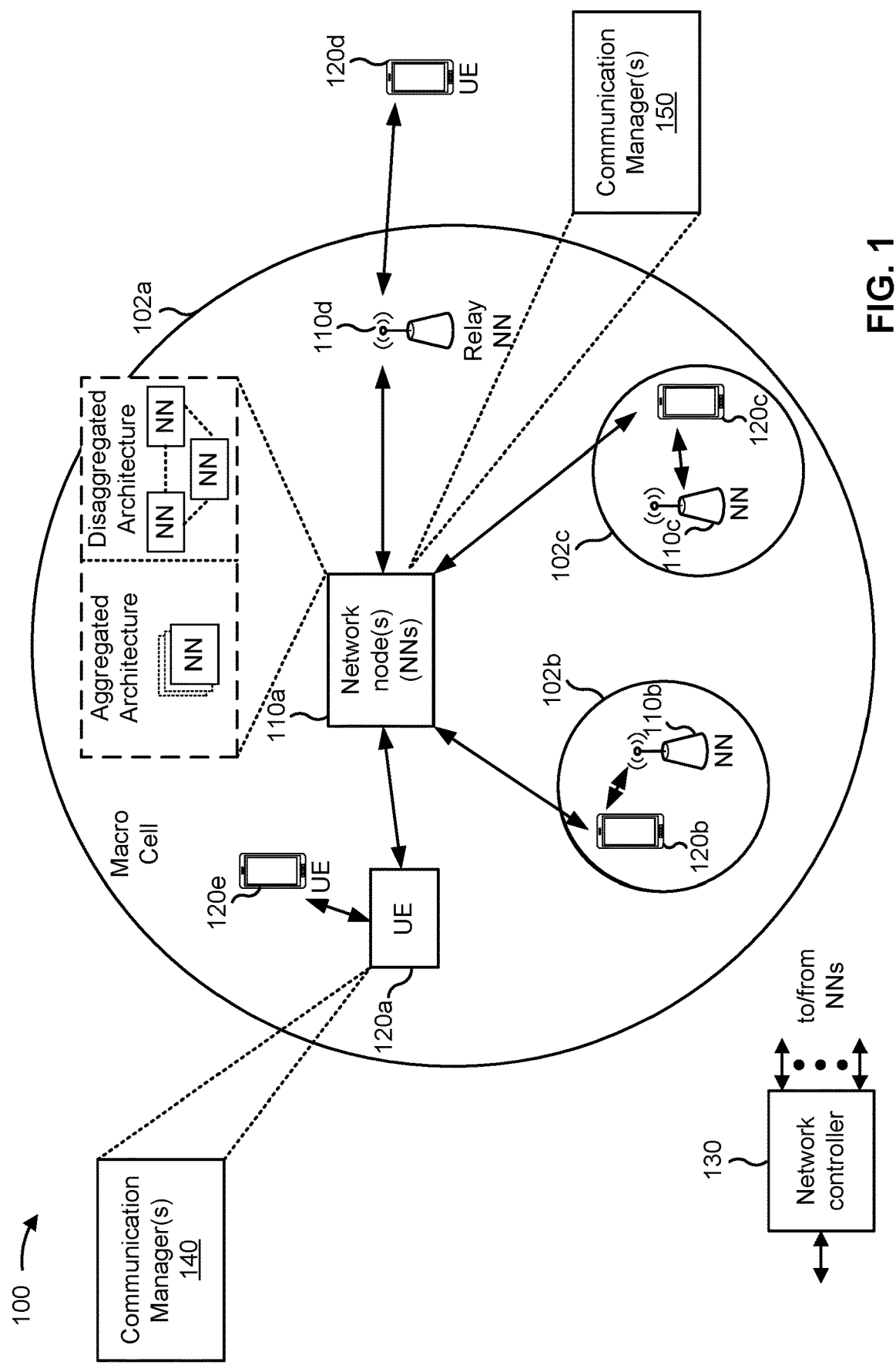
FIG. 1 is a diagram illustrating an example of a wireless network, in accordance with the present disclosure.

Some aspects described herein relate to a method of wireless communication performed by a user equipment (UE). The method may include receiving one or more reference signals (RSs) via a beam of a first frequency range (FR), the beam of the first FR being associated with a set of beams of a second FR. The method may include performing, based at least in part on the one or more RSs, beam management for communication via the second FR.

Some aspects described herein relate to a method of wireless communication performed by a network node. The method may include transmitting one or more RSs via a beam of a first FR, the beam of the first FR being associated with a set of beams of a second FR. The method may include performing, based at least in part on the one or more RSs, beam management for communication via the second FR.

Some aspects described herein relate to a UE for wireless communication. The UE may include a memory and one or more processors coupled to the memory. The one or more processors may be configured to receive one or more RSs via a beam of a first FR, the beam of the first FR being associated with a set of beams of a second FR. The one or more processors may be configured to perform, based at least in part on the one or more RSs, beam management for communication via the second FR.

Some aspects described herein relate to a network node for wireless communication. The network node may include a memory and one or more processors coupled to the memory. The one or more processors may be configured to transmit one or more RSs via a beam of a first FR, the beam of the first FR being associated with a set of beams of a second FR. The one or more processors may be configured to perform, based at least in part on the one or more RSs, beam management for communication via the second FR.

Some aspects described herein relate to a non-transitory computer-readable medium that stores a set of instructions for wireless communication by a UE. The set of instructions, when executed by one or more processors of the UE, may cause the UE to receive one or more RSs via a beam of a first FR, the beam of the first FR being associated with a set of beams of a second FR. The set of instructions, when executed by one or more processors of the UE, may cause the UE to perform, based at least in part on the one or more RSs, beam management for communication via the second FR.

Some aspects described herein relate to a non-transitory computer-readable medium that stores a set of instructions for wireless communication by a network node. The set of instructions, when executed by one or more processors of the network node, may cause the network node to transmit one or more RSs via a beam of a first FR, the beam of the first FR being associated with a set of beams of a second FR. The set of instructions, when executed by one or more processors of the network node, may cause the network node to perform, based at least in part on the one or more RSs, beam management for communication via the second FR.

Some aspects described herein relate to an apparatus for wireless communication. The apparatus may include means for receiving one or more RSs via a beam of a first FR, the beam of the first FR being associated with a set of beams of a second FR. The apparatus may include means for performing, based at least in part on the one or more RSs, beam management for communication via the second FR.

Some aspects described herein relate to an apparatus for wireless communication. The apparatus may include means for transmitting one or more RSs via a beam of a first FR, the beam of the first FR being associated with a set of beams of a second FR. The apparatus may include means for performing, based at least in part on the one or more RSs, beam management for communication via the second FR.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range (FR) designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as FR designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as FR designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified FRs.

In some aspects, the UE 120 may include a communication manager 140. As described in more detail elsewhere herein, the communication manager 140 may receive one or more reference signals (RSs) via a beam of a first FR, the beam of the first FR being associated with a set of beams of a second FR; and perform, based at least in part on the one or more RSs, beam management for communication via the second FR. Additionally, or alternatively, the communication manager 140 may perform one or more other operations described herein.

In some aspects, the network node 110 may include a communication manager 150. As described in more detail elsewhere herein, the communication manager 150 may transmit one or more RSs via a beam of a first FR, the beam of the first FR being associated with a set of beams of a second FR; and perform, based at least in part on the one or more RSs, beam management for communication via the second FR. Additionally, or alternatively, the communication manager 150 may perform one or more other operations described herein.

As indicated above, FIG. 1 is provided as an example. Other examples may differ from what is described with regard to FIG. 1.

Figure 2:
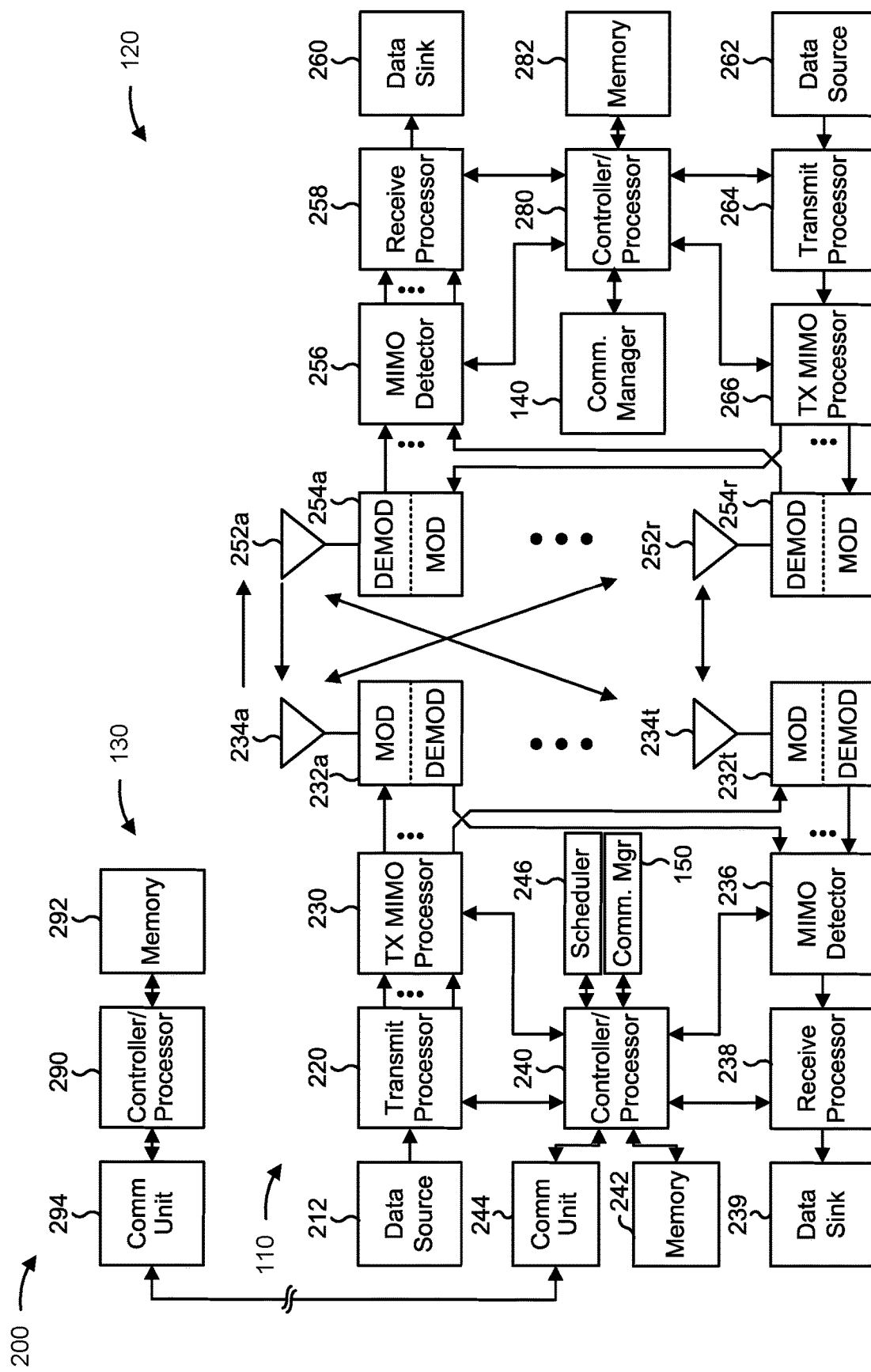
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with inter-frequency reference signal spatial mapping, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving one or more RSs via a beam of a first FR, the beam of the first FR being associated with a set of beams of a second FR; and/or means for performing, based at least in part on the one or more RSs, beam management for communication via the second FR. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting one or more RSs via a beam of a first FR, the beam of the first FR being associated with a set of beams of a second FR; and/or means for performing, based at least in part on the one or more RSs, beam management for communication via the second FR. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
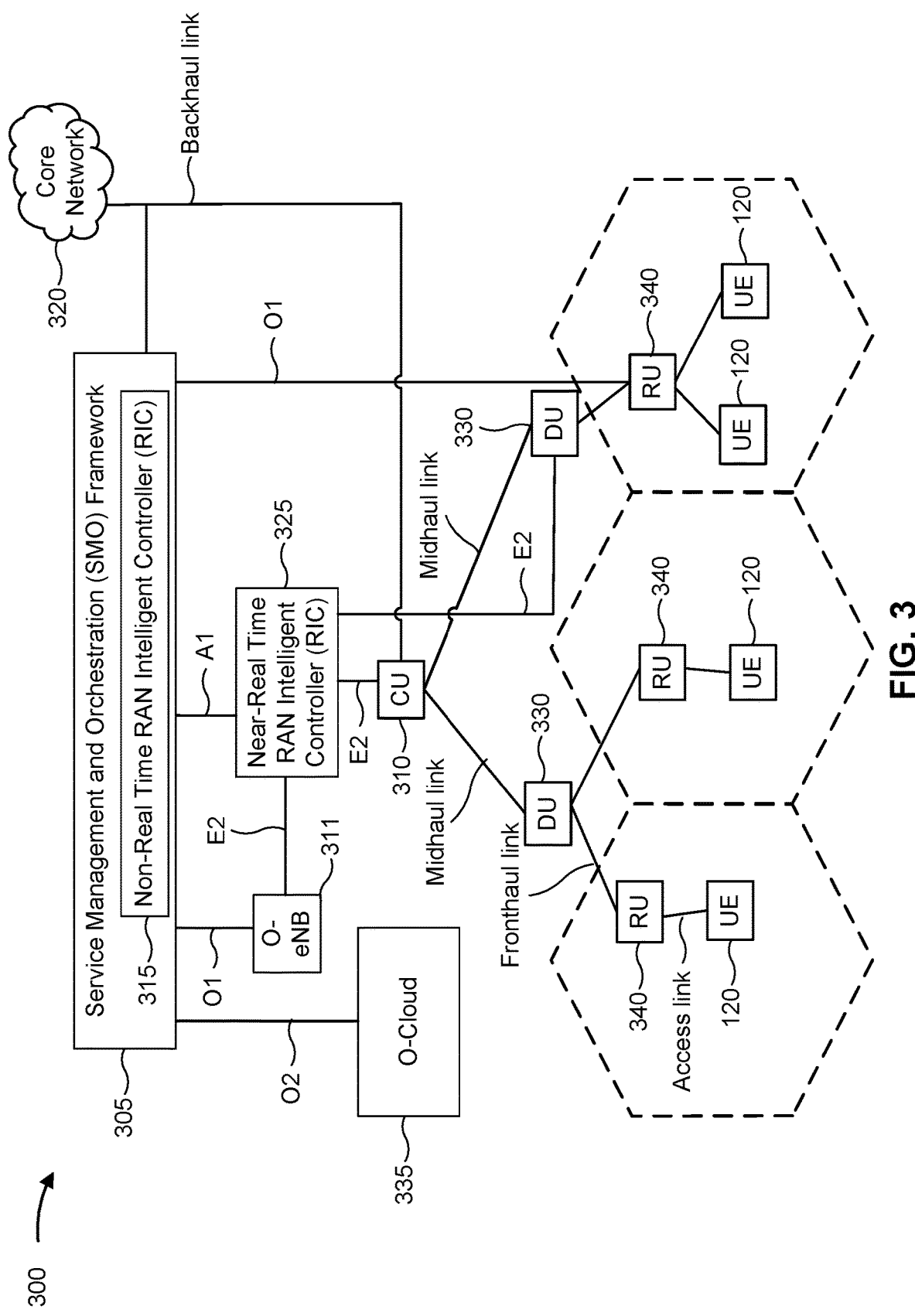
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
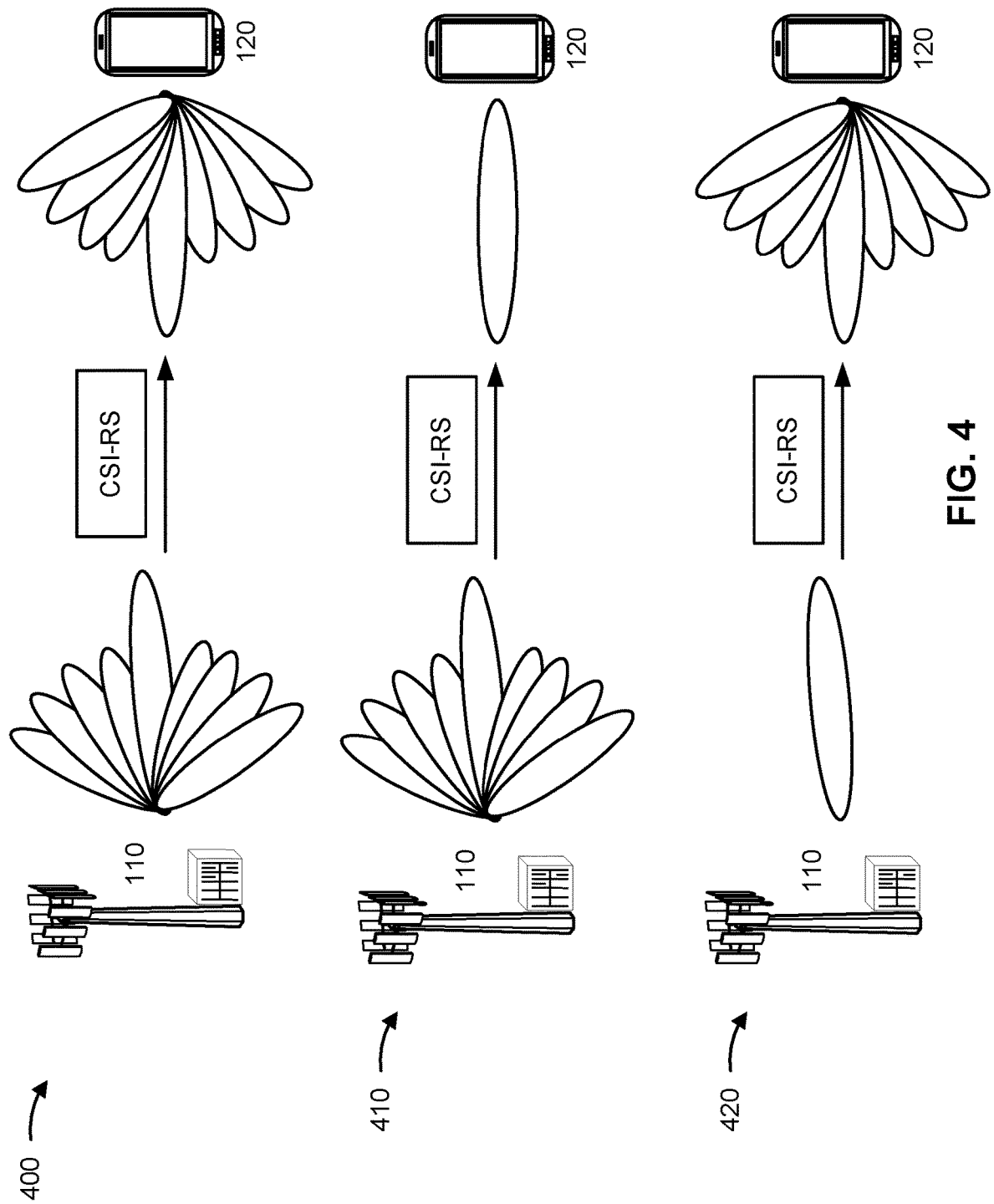
FIG. 4 is a diagram illustrating examples of CSI-RS beam management procedures, in accordance with the present disclosure.

FIG. 4 is a diagram illustrating examples 400, 410, and 420 of CSI-RS beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or transmit receive point (TRP), between a mobile termination node and a control node, between an integrated access and backhaul (IAB) child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using channel state information reference signals (CSI-RSs). Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also, or instead, use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RSs at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
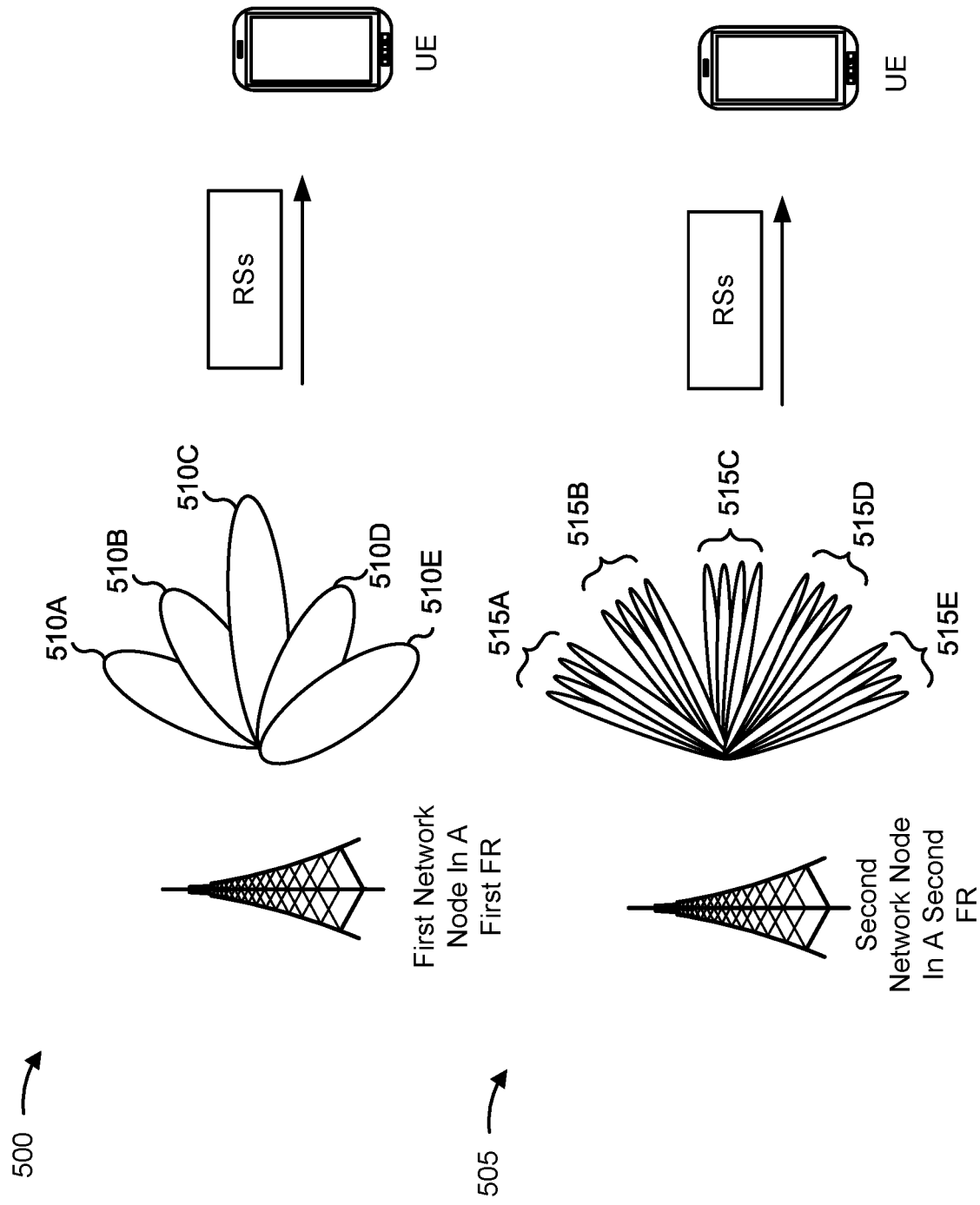
FIG. 5 is a diagram illustrating an example of beam management procedures associated with using multiple frequency ranges (FRs), in accordance with the present disclosure.

FIG. 5 is a diagram illustrating an example of beam management procedures associated with using multiple FRs, in accordance with the present disclosure.

As shown in FIG. 5, examples 500 and 505 include a UE 120 in communication with one or more network nodes in a wireless network (e.g., wireless network 100). In some aspects, the UE 120 and the network node 110 may be in a connected state (e.g., an RRC connected state) or may be in a process of establishing a connection.

As shown by example 500, a first network node may operate (e.g., providing a cell and/or forming communication links) in a first FR (e.g., FR1 or FR2). The first network node may transmit one or more RSs (e.g., CSI-RSs or SSBs, among other examples) for beam management within the first FR. For example, the first network node may transmit a first set of one or more RSs via a first beam 510A, a second set of one or more RSs via a second beam 510B, a third set of one or more RSs via a third beam 510C, a fourth set of one or more RSs via a fourth beam 510D, and/or a fifth set of one or more RSs via a fifth beam 510E.

In some networks, the first node may allocate different time and/or frequency resources to the sets of RSs on different beams. In this way, the UE may receive the RSs from different beams over different time and/or frequency resources. The UE may use the RSs as part of a beam management procedure (e.g., as described in connection with FIG. 4).

As shown by example 505, a second network node may operate in a second FR (e.g., FR3, FR4, FR5, sub-terahertz FR, among other examples). The first network node may be a same network node as the second network node. In some networks, the first network node may be co-located with the second network node. In some networks, the first network node and the second network node may not be co-located and may both have coverage at a location of the UE.

The second network node may transmit RSs (e.g., CSI-RSs or SSBs, among other examples) for beam management within the second FR. For example, the second network node may transmit a first set of RSs via a first set of beams 515A, a second set of RSs via a second set of beams 515B, a third set of RSs via a set of beams 515C, a fourth set of RSs via a fourth set of beams 515D, and/or a fifth set of RSs via a fifth set of beams 515E.

In some networks, the first node may allocate different time and/or frequency resources to the sets of RSs on different beams. In this way, the UE may receive the RSs from different beams over different time and/or frequency resources. The UE may use the RSs as part of a beam management procedure (e.g., as described in connection with FIG. 4).

Based at least in part on the second FR being above the first FR (e.g., with a lowest frequency within the second FR being higher than a highest frequency within the first FR), the sets of beams 515 may have reduced coverage relative to the beams 510. For example, a received power at the UE may be higher for the beams 510 than for the sets of beams 515.

As indicated above, FIG. 5 is provided as an example. Other examples may differ from what is described with regard to FIG. 5.

In some networks, to compensate for increased propagation loss at higher frequencies, the second network node may provide beams with reduced beamwidth to provide an increased propagation (e.g., based at least in part on focusing a transmission power within the reduced beamwidth). However, this may increase a number of beams through which the second network node may beam sweep and/or that the UE may attempt to measure, during a beam management procedure. Beam sweeping through an increased number of beams may consume power, computing, network, and/or communication resources.

In some aspects described herein, a UE and a base station may use beam measurements of a first FR (e.g., FR1 or FR2) to assist in a beam management procedure associated with a second FR (e.g., FR3, FR4, FR5 and/or sub-terahertz FRs). In some aspects, the beam measurements associated with the first FR may be used to obtain a coarse beam direction. Once the coarse beam direction is known, the UE may measure beams of the second FR that are associated with a beam of the first FR. In this way, the network node may transmit RSs via a set of narrow beams of the higher FR (the second FR) while conserving power, computing, network, and/or communication resources that may have otherwise been used to transmit via all narrow beams of the network node and/or to measure resources associated with all narrow beams of the network node.

In some aspects, a UE that supports both FRs (e.g., FR 2 or 3 and FR 4 or 5) may perform signal strength measurements based at least in part on SSBs within the first FR. Based at least in part on the beams detected in the first FR, the UE may request a special purpose SSB and/or tracking reference signals (TRSs), in a same direction as a detected beam of the first FR, for beams within the second FR. Additionally, or alternatively, the network node may indicate a set (e.g., a group) of beams in the second FR that are in a same general direction as the detected beam of the first FR. For example, the network node may transmit the indication as an indication of multiple beams of the first frequency and associated sets of beams of the second FR (e.g., the beam 510A of FIG. 5 is associated with the set of beams 515A, the beam 510B is associated with the set of beams 515B, the beam 510C is associated with the set of beams 515C, the beam 510D is associated with the set of beams 515D, and the beam 510E is associated with the set of beams 515E). The network node may transmit the indication via RRC signaling, a MAC-CE, and/or a system information block (SIB), among other examples.

In some aspects, the network node may transmit an indication that RSs (e.g., SSBs) in a same direction are synchronized. For example, when transmitting RSs associated with the first FR, the network node also transmits RSs for the second FR. In some aspects, the network node may transmit more RSs for the second FR than the first FR based at least in part on the second FR being at a higher frequency band with a higher subcarrier spacing. In some aspects, the network node may indicate the synchronization with RRC signaling (e.g., during an initial RRC connection). The UE may transmit an indication of sets of beams of the second FR that are quasi-co-located (QCL), or substantially QCL, with a beam of the first FR based at least in part on overlapping in RS transmission time. For example, if the UE receives RSs via the first FR and the second FR during an overlapping time period, the UE may indicate that associated beams of the first FR and the second FR are likely QCL. In some aspects, the UE may transmit an indication of the association and/or an indication of relative signal strengths (e.g., RSSI) between the beam in the first FR and the beams in the second FR.

The UE may measure RSs (e.g., to obtain signal strength, such as RSSI and/or RSRP) on both FRs. The UE may obtain directions of beams of the first FR and beams of the second FR and provide feedback to the network node to indicate a possible association of a beam of the first FR and a set of beams of the second FR).

Figure 6:
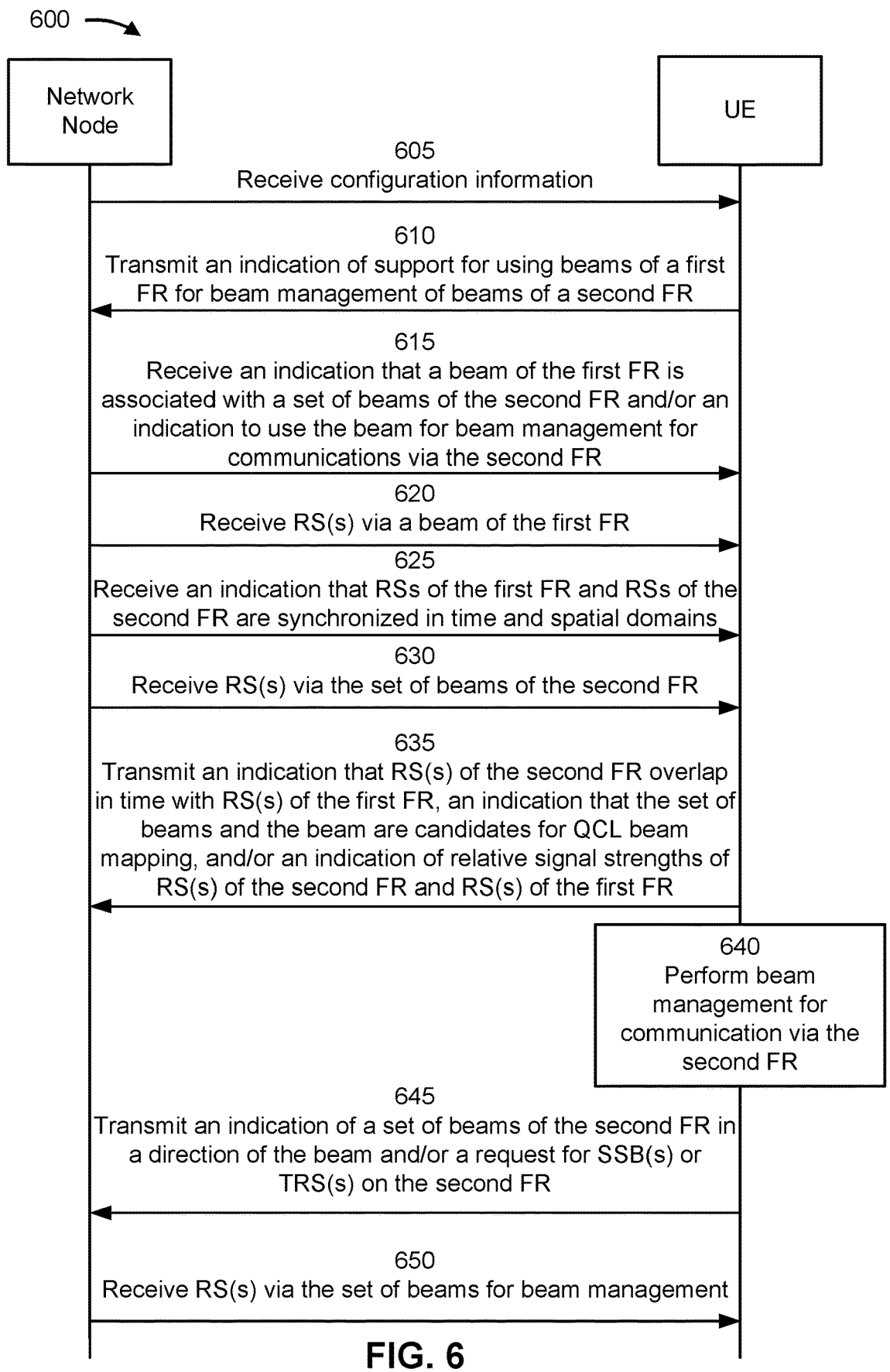
FIG. 6 is a diagram of an example associated with inter-frequency reference signal spatial mapping, in accordance with the present disclosure.

FIG. 6 is a diagram of an example 600 associated with inter-frequency reference signal spatial mapping, in accordance with the present disclosure. As shown in FIG. 6, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6. The inter-frequency reference signal spatial mapping may include mapping a beam of a first FR (e.g., a lower frequency FR) to a set of beams of a second FR (e.g., a higher frequency FR, such as FR4, FR5, and/or sub terahertz frequencies) based at least in part on spatial parameters (e.g., being QCL or substantially QCL).

As shown by reference number 605, the network node may transmit, and the UE may receive, configuration information. In some aspects, the UE may receive the configuration information via one or more of RRC signaling, one or more medium access control (MAC) control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to use measurements of RSs of a first FR to assist in beam management on a second FR. For example, the configuration information may indicate that the UE is to identify a beam of the first FR (e.g., having highest signal strength) and use an association of the beam of the first FR to identify a set of beams of the second FR to use in a beam management procedure (e.g., for beam sweeping over a subset of all beams of the second FR). In some aspects, the configuration information may indicate a procedure for using the measurements of RSs of the first FR to assist in beam management on the second FR. In some aspects, the configuration information, or another communication, may indicate to use beams of the first FR for beam management for communications via the second FR.

The UE may configure itself based at least in part on the configuration information. In some aspects, the UE may be configured to perform one or more operations described herein based at least in part on the configuration information.

As shown by reference number 610, the UE may transmit, and the network node may receive, an indication of support for using beams of a first FR for beam management of beams of a second FR (e.g., in a capabilities report). For example, the UE may transmit an indication of support for measuring RSs on the first FR, on the second FR, and/or simultaneously on both FRs.

In some aspects, a highest frequency in the first FR is lower than a lowest frequency in the second FR. In some aspects, a highest frequency in the second FR is at least double a highest frequency in the first FR.

As shown by reference number 615, the UE may receive, and the network node may transmit, an indication that a beam of the first FR is associated with a set of beams of the second FR and/or an indication to use the beam for beam management for communications via the second FR. In some aspects, the UE may receive the indication as an indication of an association, in a spatial dimension, between the beam of the first FR and the set of beams of the second FR. In some aspects, the network node may be aware of the association based at least in part on a configuration of the network node and/or based at least in part on feedback previously received from UEs that indicate a likelihood of an association in a spatial dimension.

As shown by reference number 620, the UE may receive one or more RSs via a beam of the first FR. In some aspects, the UE may receive one or more RSs on multiple beams of the first FR and may select the beam as a best beam (e.g., based at least in part on signal strength) of the multiple beams. In some aspects, the beam of the first FR may be associated with a set of beams of the second FR. In some aspects, the UE is aware of the association (e.g., based at least in part on an indication from the network node). In some aspects, the UE determines the association based at least in part on measuring the RSs of the first FR.

As shown by reference number 625, the UE may receive, and the network node may transmit, an indication that RSs of the first FR and RSs of the second FR are synchronized in time and spatial domains. In some aspects, this may indicate that RSs of the first FR and RSs of the second FR that the UE receives during a same time period are QCL or are likely to be QCL. In some aspects, the network node may transmit the indication of synchronization via RRC signaling and/or a MAC CE.

As shown by reference number 630, the UE may receive, and the network node may transmit, one or more RSs via the set of beams of the second FR. In some aspects, the UE may receive the one or more RSs via the set of beams of the second FR during a same time window as reception of the one or more RSs via the beam of the first FR. Based at least in part on the indication described in connection with reference number 625, the UE may determine that the set of beams of the second FR are likely QCL with the beam of the first FR.

As shown by reference number 635, the UE may transmit, and the network node may receive, an indication that one or more RSs of the second FR overlap in time with one or more RSs of the first FR. Additionally, or alternatively, the UE may transmit an indication that the set of beams and the beam are candidates for QCL beam mapping and/or an indication of relative signal strengths of one or more RSs of the second FR and one or more RSs of the first FR.

The network node may use the indication of overlapping in time, the indication of being candidates for QCL beam mapping, and/or the indication of relative signal strengths to determine beam mapping between the first FR and the second FR. For example, the network node may use a machine learning model and/or artificial intelligence to learn associations.

As shown by reference number 640, the UE may perform beam management for communication via the second FR. In some aspects, performing beam management may include one or more operations described in connection with reference numbers 645-655. In some aspects, the UE may perform beam management based at least in part on receiving the one or more RSs described in connection with reference number 620 (e.g., without one or more operations described in connection with reference numbers 625-635).

As shown by reference number 645, the UE may transmit, and the network node may receive, an indication of a set of beams of the second FR in a direction of the beam and/or a request for one or more SSBs and/or one or more TRSs on the second FR and in a direction of the beam of the first FR. In some aspects, the UE may indicate the set of beams based at least in part on an indication of the set of beams within the second FR. In some aspects, the UE may indicate the set of beams based at least in part on an indication of the beam within the first FR.

In some aspects, the set of beams of the second FR cover a full or partial spatial dimension of the beam of the first FR. For example, based at least in part on the beam of the first FR being a best beam as measured on the first FR, the UE may indicate the set of beams of the second FR that cover the full or partial spatial dimension of the beam of the first FR. In some aspects, the UE may request one or more SSBs and/or tracking RSs on the second FR to determine a best beam (e.g., based at least in part on signal strength) of the set of beams for communication via the second FR.

In some aspects, the network node may transmit the indication of the association via RRC signaling that maps multiple beams of the first FR to multiple sets of beams of the second FR. In some aspects, the network node may transmit the indication of the association via a system information block (SIB). In some aspects, the network node may transmit the indication of the association via RRC signaling that indicates the association between the beam of the first FR and the set of beams of the second FR. In some aspects, the network node may transmit the indication of the association via a MAC CE that indicates the association between the beam of the first FR and the set of beams of the second FR.

In some aspects, the beam and the set of beams are at least partially QCL. For example, the beam and the set of beams may partially overlap in a spatial dimension (e.g., in a lateral and/or elevational dimension). In some aspects, the beam and the set of beams may not be QCL and may appear to be QCL by the UE based at least in part on a reception angle of the beams and the set of beams.

As shown by reference number 650, the UE may receive, and the network node may transmit, one or more RSs via the set of beams for beam management associated with the second FR. The UE may measure the set of beams to identify a best beam of the set of beams for communication via the second FR. The UE may perform one or more additional beam management procedures, such as reporting signal strengths to the network node and/or configuring the UE for communication via a reception beam associated with receiving subsequent communications via a beam of the second FR.

Based at least in part on the UE using the one or more RSs of the first FR to assist in beam management via the second FR, the network node may transmit RSs via a set of narrow beams of the second FR while conserving power, computing, network, and/or communication resources that may have otherwise been used to transmit via all narrow beams of the network node and/or to measure resources associated with all narrow beams of the network node.

As indicated above, FIG. 6 is provided as an example. Other examples may differ from what is described with respect to FIG. 6.

Figure 7:
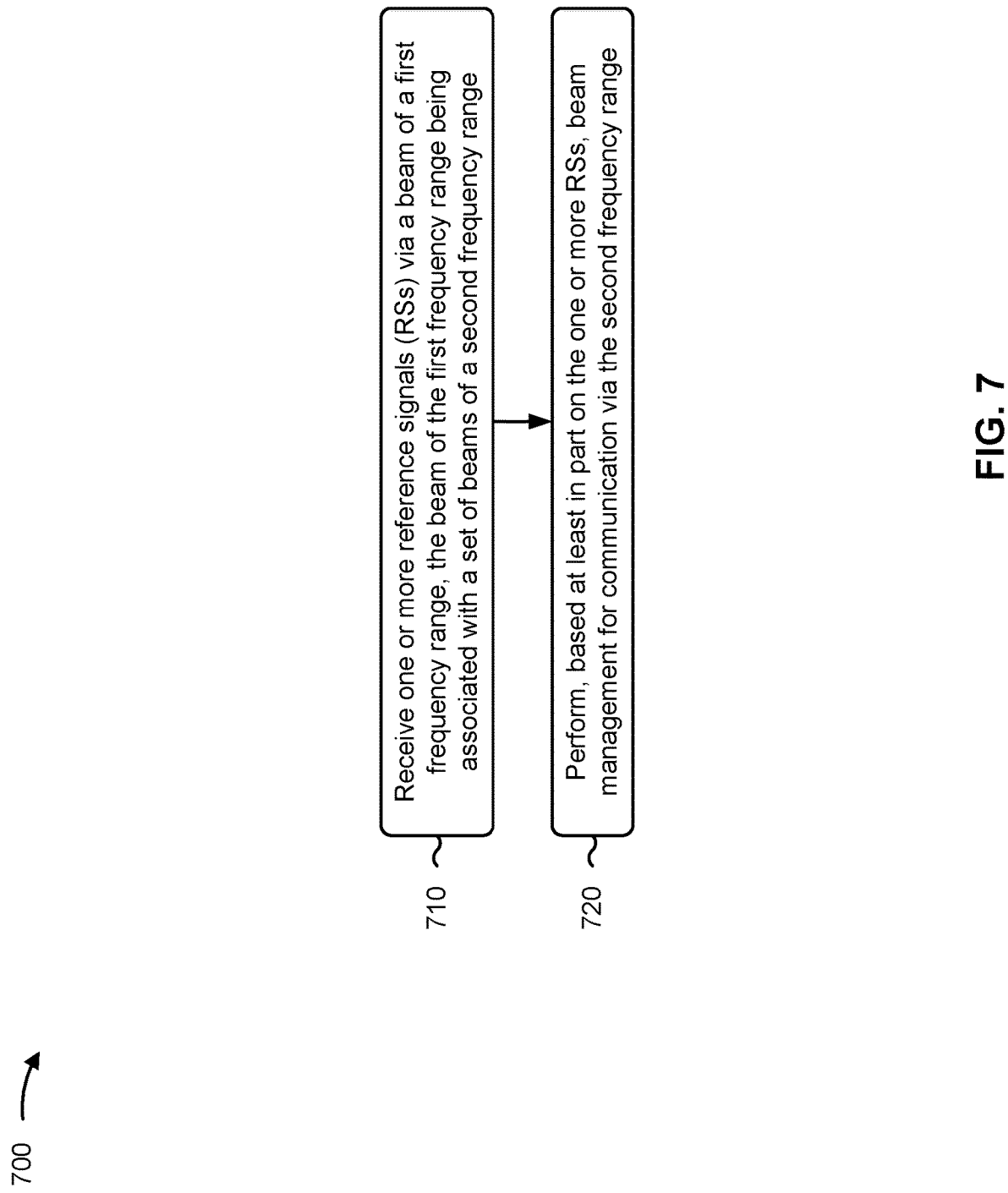
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with inter-frequency reference signal spatial mapping.

As shown in FIG. 7, in some aspects, process 700 may include receiving one or more RSs via a beam of a first FR, the beam of the first FR being associated with a set of beams of a second FR (block 710). For example, the UE (e.g., using communication manager 140 and/or reception component 902, depicted in FIG. 9) may receive one or more RSs via a beam of a first FR, the beam of the first FR being associated with a set of beams of a second FR, as described above.

As further shown in FIG. 7, in some aspects, process 700 may include performing, based at least in part on the one or more RSs, beam management for communication via the second FR (block 720). For example, the UE (e.g., using communication manager 140 and/or communication manager 908, depicted in FIG. 9) may perform, based at least in part on the one or more RSs, beam management for communication via the second FR, as described above.

Process 700 may include additional aspects, such as any single aspect or any combination of aspects described below and/or in connection with one or more other processes described elsewhere herein.

In a first aspect, the set of beams of the second FR cover a full spatial dimension of the beam of the first FR.

In a second aspect, alone or in combination with the first aspect, a highest frequency in the first FR is lower than a lowest frequency in the second FR.

In a third aspect, alone or in combination with one or more of the first and second aspects, process 700 includes transmitting an indication of support for using beams of the first FR associated with beam management for communications via the second FR.

In a fourth aspect, alone or in combination with one or more of the first through third aspects, process 700 includes receiving an indication to use beams of the first FR for beam management for communications via the second FR.

In a fifth aspect, alone or in combination with one or more of the first through fourth aspects, the beam and the set of beams are at least partially quasi-co-located (QCL).

In a sixth aspect, alone or in combination with one or more of the first through fifth aspects, process 700 includes transmitting, based at least in part on receiving the one or more RSs, a request for one or more synchronization signal blocks (SSBs) or tracking RSs on the second FR and in a direction of the beam.

In a seventh aspect, alone or in combination with one or more of the first through sixth aspects, process 700 includes receiving an indication of an association, in a spatial dimension, between the beam of the first FR and the set of beams of the second FR.

In an eighth aspect, alone or in combination with one or more of the first through seventh aspects, the indication of the association comprises RRC signaling that maps multiple beams of the first FR to multiple sets of beams of the second FR, a system information block (SIB), RRC signaling that indicates the association between the beam of the first FR and the set of beams of the second FR, or a medium access control (MAC) control element (CE) that indicates the association between the beam of the first FR and the set of beams of the second FR.

In a ninth aspect, alone or in combination with one or more of the first through eighth aspects, process 700 includes receiving an indication that RSs of the first FR and RSs of the second FR are synchronized in time and spatial domains.

In a tenth aspect, alone or in combination with one or more of the first through ninth aspects, receiving the indication comprises receiving the indication via RRC signaling.

In an eleventh aspect, alone or in combination with one or more of the first through tenth aspects, process 700 includes receiving one or more additional RSs via the set of beams of the second FR and transmitting an indication that the one or more additional RSs and the one or more RSs overlap in time.

In a twelfth aspect, alone or in combination with one or more of the first through eleventh aspects, process 700 includes transmitting an indication of relative signal strengths of the one or more additional RSs and the one or more RSs.

In a thirteenth aspect, alone or in combination with one or more of the first through twelfth aspects, process 700 includes transmitting an indication of the set of beams of the second FR based at least in part on a measurement of the one or more RSs via the beam.

In a fourteenth aspect, alone or in combination with one or more of the first through thirteenth aspects, process 700 includes receiving one or more additional RSs via the set of beams of the second FR, and transmitting an indication that the set of beams and the beam are candidates for QCL beam mapping for the first FR and the second FR.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
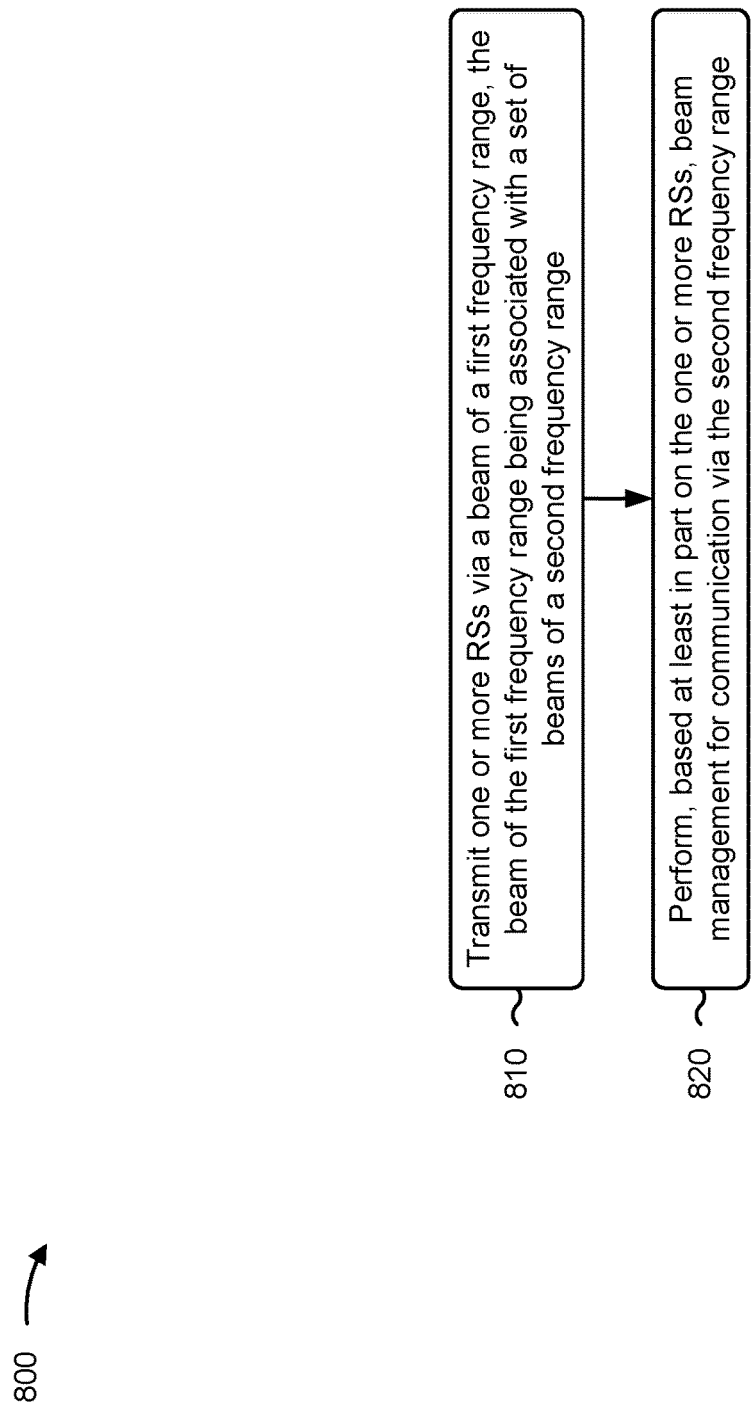
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110]) performs operations associated with inter-frequency reference signal spatial mapping.

As shown in FIG. 8, in some aspects, process 800 may include transmitting one or more RSs via a beam of a first FR, the beam of the first FR being associated with a set of beams of a second FR (block 810). For example, the network node (e.g., using communication manager 150 and/or transmission component 1004, depicted in FIG. 10) may transmit one or more RSs via a beam of a first FR, the beam of the first FR being associated with a set of beams of a second FR, as described above.

As further shown in FIG. 8, in some aspects, process 800 may include performing, based at least in part on the one or more RSs, beam management for communication via the second FR (block 820). For example, the network node (e.g., using communication manager 150 and/or communication manager 1008, depicted in FIG. 10) may perform, based at least in part on the one or more RSs, beam management for communication via the second FR, as described above.

Process 800 may include additional aspects, such as any single aspect or any combination of aspects described below and/or in connection with one or more other processes described elsewhere herein.

In a first aspect, the set of beams of the second FR cover a full spatial dimension of the beam of the first FR.

In a second aspect, alone or in combination with the first aspect, process 800 includes receiving an indication of support for using beams of the first FR associated with beam management for communications via the second FR.

In a third aspect, alone or in combination with one or more of the first and second aspects, process 800 includes transmitting an indication to use beams of the first FR for beam management for communications via the second FR.

In a fourth aspect, alone or in combination with one or more of the first through third aspects, the beam and the set of beams are at least partially QCL.

In a fifth aspect, alone or in combination with one or more of the first through fourth aspects, process 800 includes receiving, based at least in part on receiving the one or more RSs, a request for one or more SSBs or tracking RSs on the second FR and in a direction of the beam.

In a sixth aspect, alone or in combination with one or more of the first through fifth aspects, process 800 includes transmitting an indication of an association, in a spatial dimension, between the beam of the first FR and the set of beams of the second FR.

In a seventh aspect, alone or in combination with one or more of the first through sixth aspects, the indication of the association comprises RRC signaling that maps multiple beams of the first FR to multiple sets of beams of the second FR, an SIB, RRC signaling that indicates the association between the beam of the first FR and the set of beams of the second FR, or a MAC CE that indicates the association between the beam of the first FR and the set of beams of the second FR.

In an eighth aspect, alone or in combination with one or more of the first through seventh aspects, process 800 includes transmitting an indication that RSs of the first FR and RSs of the second FR are synchronized in time and spatial domains.

In a ninth aspect, alone or in combination with one or more of the first through eighth aspects, process 800 includes transmitting one or more additional RSs via the set of beams of the second FR and receiving an indication that the one or more additional RSs and the one or more RSs overlap in time.

In a tenth aspect, alone or in combination with one or more of the first through ninth aspects, process 800 includes receiving an indication of relative signal strengths of the one or more additional RSs and the one or more RSs.

In an eleventh aspect, alone or in combination with one or more of the first through tenth aspects, process 800 includes receiving an indication of the set of beams of the second FR based at least in part on a measurement of the one or more RSs via the beam.

In a twelfth aspect, alone or in combination with one or more of the first through eleventh aspects, process 800 includes transmitting one or more additional RSs via the set of beams of the second FR, and receiving an indication that the set of beams and the beam are candidates for QCL beam mapping for the first FR and the second FR.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
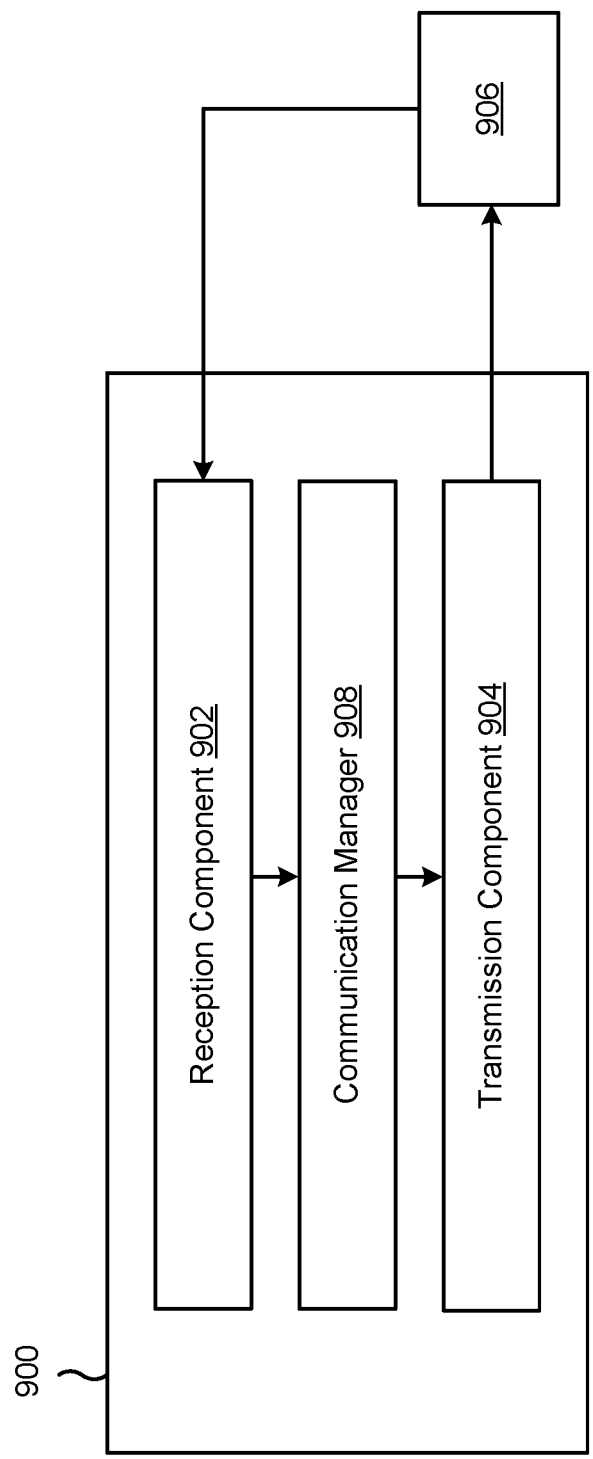
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., the communication manager 140).

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive one or more RSs via a beam of a first FR, the beam of the first FR being associated with a set of beams of a second FR. The communication manager 908 may perform, based at least in part on the one or more RSs, beam management for communication via the second FR.

The transmission component 904 may transmit an indication of support for using beams of the first FR associated with beam management for communications via the second FR.

The reception component 902 may receive an indication to use beams of the first FR for beam management for communications via the second FR.

The transmission component 904 may transmit, based at least in part on receiving the one or more RSs, a request for one or more SSBs or tracking RSs on the second FR and in a direction of the beam.

The reception component 902 may receive an indication of an association, in a spatial dimension, between the beam of the first FR and the set of beams of the second FR.

The reception component 902 may receive an indication that RSs of the first FR and RSs of the second FR are synchronized in time and spatial domains.

The reception component 902 may receive one or more additional RSs via the set of beams of the second FR.

The transmission component 904 may transmit an indication that the one or more additional RSs and the one or more RSs overlap in time.

The transmission component 904 may transmit an indication of relative signal strengths of the one or more additional RSs and the one or more RSs.

The transmission component 904 may transmit an indication of the set of beams of the second FR based at least in part on a measurement of the one or more RSs via the beam.

The reception component 902 may receive one or more additional RSs via the set of beams of the second FR.

The transmission component 904 may transmit an indication that the set of beams and the beam are candidates for QCL beam mapping for the first FR and the second FR.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
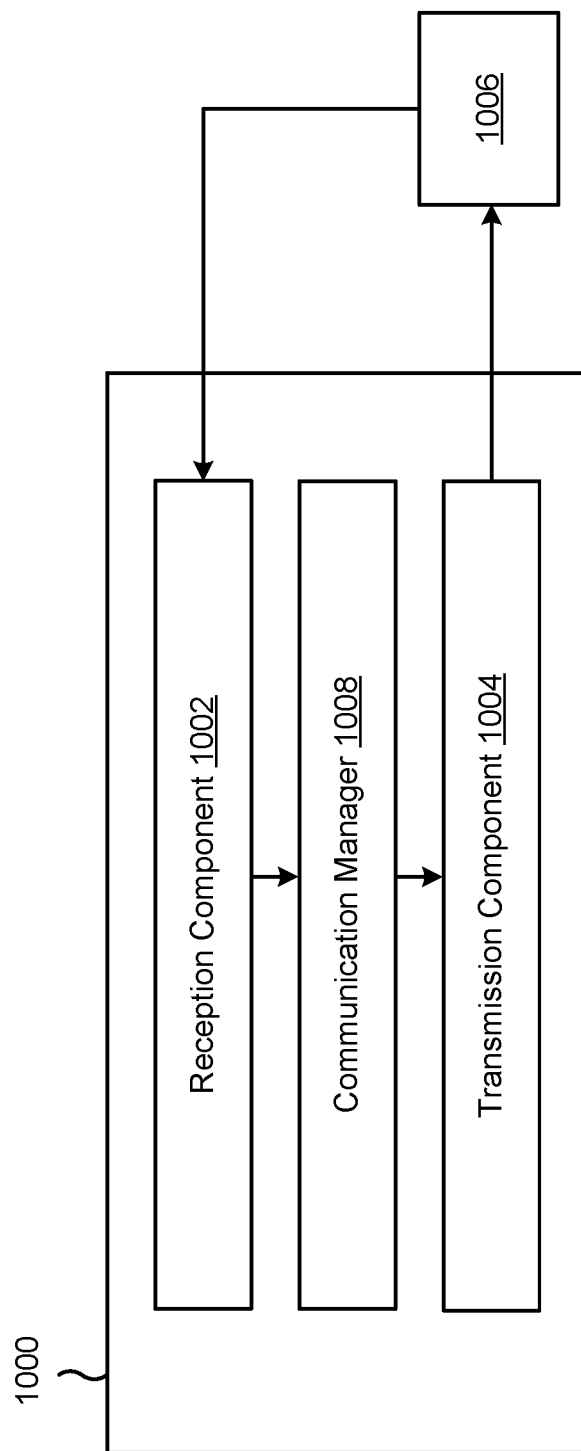
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150).

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit one or more RSs via a beam of a first FR, the beam of the first FR being associated with a set of beams of a second FR. The communication manager 1008 may perform, based at least in part on the one or more RSs, beam management for communication via the second FR.

The reception component 1002 may receive an indication of support for using beams of the first FR associated with beam management for communications via the second FR.

The transmission component 1004 may transmit an indication to use beams of the first FR for beam management for communications via the second FR.

The reception component 1002 may receive, based at least in part on receiving the one or more RSs, a request for one or more SSBs or tracking RSs on the second FR and in a direction of the beam.

The transmission component 1004 may transmit an indication of an association, in a spatial dimension, between the beam of the first FR and the set of beams of the second FR.

The transmission component 1004 may transmit an indication that RSs of the first FR and RSs of the second FR are synchronized in time and spatial domains.

The transmission component 1004 may transmit one or more additional RSs via the set of beams of the second FR.

The reception component 1002 may receive an indication that the one or more additional RSs and the one or more RSs overlap in time.

The reception component 1002 may receive an indication of relative signal strengths of the one or more additional RSs and the one or more RSs.

The reception component 1002 may receive an indication of the set of beams of the second FR based at least in part on a measurement of the one or more RSs via the beam.

The transmission component 1004 may transmit one or more additional RSs via the set of beams of the second FR.

The reception component 1002 may receive an indication that the set of beams and the beam are candidates for QCL beam mapping for the first FR and the second FR.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving one or more reference signals (RSs) via a beam of a first frequency range, the beam of the first frequency range being associated with a set of beams of a second frequency range; and performing, based at least in part on the one or more RSs, beam management for communication via the second frequency range.

Aspect 2: The method of Aspect 1, wherein the set of beams of the second frequency range cover a full spatial dimension of the beam of the first frequency range.

Aspect 3: The method of any of Aspects 1-2, wherein a highest frequency in the first frequency range is lower than a lowest frequency in the second frequency range.

Aspect 4: The method of any of Aspects 1-3, further comprising: transmitting an indication of support for using beams of the first frequency range associated with beam management for communications via the second frequency range.

Aspect 5: The method of any of Aspects 1-4, further comprising: receiving an indication to use beams of the first frequency range for beam management for communications via the second frequency range.

Aspect 6: The method of any of Aspects 1-5, wherein the beam and the set of beams are at least partially quasi-co-located (QCL).

Aspect 7: The method of any of Aspects 1-6, further comprising: transmitting, based at least in part on receiving the one or more RSs, a request for one or more synchronization signal blocks (SSBs) or tracking RSs on the second frequency range and in a direction of the beam.

Aspect 8: The method of any of Aspects 1-7, further comprising: receiving an indication of an association, in a spatial dimension, between the beam of the first frequency range and the set of beams of the second frequency range.

Aspect 9: The method of Aspect 8, wherein the indication of the association comprises: radio resource control (RRC) signaling that maps multiple beams of the first frequency range to multiple sets of beams of the second frequency range, a system information block (SIB), RRC signaling that indicates the association between the beam of the first frequency range and the set of beams of the second frequency range, or a medium access control (MAC) control element (CE) that indicates the association between the beam of the first frequency range and the set of beams of the second frequency range.

Aspect 10: The method of any of Aspects 1-9, further comprising: receiving an indication that RSs of the first frequency range and RSs of the second frequency range are synchronized in time and spatial domains.

Aspect 11: The method of Aspect 10, wherein receiving the indication comprises: receiving the indication via radio resource control (RRC) signaling.

Aspect 12: The method of any of Aspects 10-11, further comprising: receiving one or more additional RSs via the set of beams of the second frequency range: and transmitting an indication that the one or more additional RSs and the one or more RSs overlap in time.

Aspect 13: The method of Aspect 12, further comprising: transmitting an indication of relative signal strengths of the one or more additional RSs and the one or more RSs.

Aspect 14: The method of any of Aspects 1-13, further comprising: transmitting an indication of the set of beams of the second frequency range based at least in part on a measurement of the one or more RSs via the beam.

Aspect 15: The method of any of Aspects 1-14, further comprising: receiving one or more additional RSs via the set of beams of the second frequency range; and transmitting an indication that the set of beams and the beam are candidates for quasi-co-located (QCL) beam mapping for the first frequency range and the second frequency range.

Aspect 16: A method of wireless communication performed by a network node, comprising: transmitting one or more reference signals (RSs) via a beam of a first frequency range, the beam of the first frequency range being associated with a set of beams of a second frequency range; and performing, based at least in part on the one or more RSs, beam management for communication via the second frequency range.

Aspect 17: The method of Aspect 16, wherein the set of beams of the second frequency range cover a full spatial dimension of the beam of the first frequency range.

Aspect 18: The method of any of Aspects 16-17, further comprising: receiving an indication of support for using beams of the first frequency range associated with beam management for communications via the second frequency range.

Aspect 19: The method of any of Aspects 16-18, further comprising: transmitting an indication to use beams of the first frequency range for beam management for communications via the second frequency range.

Aspect 20: The method of any of Aspects 16-19, wherein the beam and the set of beams are at least partially quasi-co-located (QCL).

Aspect 21: The method of any of Aspects 16-20, further comprising: receiving, based at least in part on receiving the one or more RSs, a request for one or more synchronization signal blocks (SSBs) or tracking RSs on the second frequency range and in a direction of the beam.

Aspect 22: The method of any of Aspects 16-21, further comprising: transmitting an indication of an association, in a spatial dimension, between the beam of the first frequency range and the set of beams of the second frequency range.

Aspect 23: The method of Aspect 22, wherein the indication of the association comprises: radio resource control (RRC) signaling that maps multiple beams of the first frequency range to multiple sets of beams of the second frequency range, a system information block (SIB), RRC signaling that indicates the association between the beam of the first frequency range and the set of beams of the second frequency range, or a medium access control (MAC) control element (CE) that indicates the association between the beam of the first frequency range and the set of beams of the second frequency range.

Aspect 24: The method of any of Aspects 16-23, further comprising: transmitting an indication that RSs of the first frequency range and RSs of the second frequency range are synchronized in time and spatial domains.

Aspect 25: The method of Aspect 24, further comprising: transmitting one or more additional RSs via the set of beams of the second frequency range: and receiving an indication that the one or more additional RSs and the one or more RSs overlap in time.

Aspect 26: The method of Aspect 25, further comprising: receiving an indication of relative signal strengths of the one or more additional RSs and the one or more RSs.

Aspect 27: The method of any of Aspects 16-26, further comprising: receiving an indication of the set of beams of the second frequency range based at least in part on a measurement of the one or more RSs via the beam.

Aspect 28: The method of any of Aspects 16-27, further comprising: transmitting one or more additional RSs via the set of beams of the second frequency range; and receiving an indication that the set of beams and the beam are candidates for quasi-co-located (QCL) beam mapping for the first frequency range and the second frequency range.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive one or more reference signals (RSs) via a beam of a first frequency range, the beam of the first frequency range being associated with a set of beams of a second frequency range, wherein the beam of the first frequency range and the set of beams of the second frequency range are only partially quasi-co-located (QCL); and
      perform, based at least in part on the one or more RSs, beam management for communication via the second frequency range.

2. The UE of claim 1, wherein the set of beams of the second frequency range cover a full spatial dimension of the beam of the first frequency range.

3. The UE of claim 1, wherein a highest frequency in the first frequency range is lower than a lowest frequency in the second frequency range.

4. The UE of claim 1, wherein the one or more processors are further configured to:
   transmit an indication of support for using beams of the first frequency range associated with beam management for communications via the second frequency range.

5. The UE of claim 1, wherein the one or more processors are further configured to:
   receive an indication to use beams of the first frequency range for beam management for communications via the second frequency range.

6. The UE of claim 1, wherein the one or more processors are further configured to:
   transmit, based at least in part on receiving the one or more RSs, a request for one or more synchronization signal blocks (SSBs) or tracking RSs on the second frequency range and in a direction of the beam of the first frequency range.

7. The UE of claim 1, wherein the one or more processors are further configured to:
   receive an indication of an association, in a spatial dimension, between the beam of the first frequency range and the set of beams of the second frequency range.

8. The UE of claim 7, wherein the indication of the association comprises:
   radio resource control (RRC) signaling that maps multiple beams of the first frequency range to multiple sets of beams of the second frequency range,
   a system information block (SIB),
   RRC signaling that indicates the association between the beam of the first frequency range and the set of beams of the second frequency range, or
   a medium access control (MAC) control element (CE) that indicates the association between the beam of the first frequency range and the set of beams of the second frequency range.

9. The UE of claim 1, wherein the one or more processors are further configured to:
   receive an indication that RSs of the first frequency range and RSs of the second frequency range are synchronized in time and spatial domains.

10. The UE of claim 9, wherein the one or more processors, to receive the indication, are configured to:
receive the indication via radio resource control (RRC) signaling.

11. The UE of claim 9, wherein the one or more processors are further configured to:
receive one or more additional RSs via the set of beams of the second frequency range: and
transmit an indication that the one or more additional RSs and the one or more RSs overlap in time.

12. The UE of claim 11, wherein the one or more processors are further configured to:
transmit an indication of relative signal strengths of the one or more additional RSs and the one or more RSs.

13. The UE of claim 1, wherein the one or more processors are further configured to:
transmit an indication of the set of beams of the second frequency range based at least in part on a measurement of the one or more RSs via the beam of the first frequency range.

14. The UE of claim 1, wherein the one or more processors are further configured to:
receive one or more additional RSs via the set of beams of the second frequency range; and
transmit an indication that the set of beams and the beam of the first frequency range are candidates for quasi-co-located (QCL) beam mapping for the first frequency range and the second frequency range.

15. A network node for wireless communication, comprising:
one or more memories; and
one or more processors, coupled to the one or more memories, configured to:
transmit one or more reference signals (RSs) via a beam of a first frequency range, the beam of the first frequency range being associated with a set of beams of a second frequency range, wherein the beam of the first frequency range and the set of beams of the second frequency range are only partially quasi-co-located (QCL); and
perform, based at least in part on the one or more RSs, beam management for communication via the second frequency range.

16. The network node of claim 15, wherein the set of beams of the second frequency range cover a full spatial dimension of the beam of the first frequency range.

17. The network node of claim 15, wherein the one or more processors are further configured to:
receive an indication of support for using beams of the first frequency range associated with beam management for communications via the second frequency range.

18. The network node of claim 15, wherein the one or more processors are further configured to:
transmit an indication to use beams of the first frequency range for beam management for communications via the second frequency range.

19. The network node of claim 15, wherein the one or more processors are further configured to:
receive, based at least in part on receiving the one or more RSs, a request for one or more synchronization signal blocks (SSBs) or tracking RSs on the second frequency range and in a direction of the beam of the first frequency range.

20. The network node of claim 15, wherein the one or more processors are further configured to:
transmit an indication of an association, in a spatial dimension, between the beam of the first frequency range and the set of beams of the second frequency range.

21. The network node of claim 20, wherein the indication of the association comprises:
radio resource control (RRC) signaling that maps multiple beams of the first frequency range to multiple sets of beams of the second frequency range,
a system information block (SIB),
RRC signaling that indicates the association between the beam of the first frequency range and the set of beams of the second frequency range, or
a medium access control (MAC) control element (CE) that indicates the association between the beam of the first frequency range and the set of beams of the second frequency range.

22. The network node of claim 15, wherein the one or more processors are further configured to:
transmit an indication that RSs of the first frequency range and RSs of the second frequency range are synchronized in time and spatial domains.

23. The network node of claim 22, wherein the one or more processors are further configured to:
transmit one or more additional RSs via the set of beams of the second frequency range: and
receive an indication that the one or more additional RSs and the one or more RSs overlap in time.

24. The network node of claim 23, wherein the one or more processors are further configured to:
receive an indication of relative signal strengths of the one or more additional RSs and the one or more RSs.

25. The network node of claim 15, wherein the one or more processors are further configured to:
receive an indication of the set of beams of the second frequency range based at least in part on a measurement of the one or more RSs via the beam of the first frequency range.

26. The network node of claim 15, wherein the one or more processors are further configured to:
transmit one or more additional RSs via the set of beams of the second frequency range; and
receive an indication that the set of beams of the second frequency range and the beam of the first frequency range are candidates for quasi-co-located (QCL) beam mapping for the first frequency range and the second frequency range.

27. A method of wireless communication performed by a user equipment (UE), comprising:
receiving one or more reference signals (RSS) via a beam of a first frequency range, the beam of the first frequency range being associated with a set of beams of a second frequency range, wherein the beam of the first frequency range and the set of beams of the second frequency range are only partially quasi-co-located (QCL); and
performing, based at least in part on the one or more RSs, beam management for communication via the second frequency range.

28. The method of claim 27, wherein the set of beams of the second frequency range cover a full spatial dimension of the beam of the first frequency range.

29. A method of wireless communication performed by a network node, comprising:
- transmitting one or more reference signals (RSS) via a beam of a first frequency range, the beam of the first frequency range being associated with a set of beams of a second frequency range, wherein the beam of the first frequency range and the set of beams of the second frequency range are only partially quasi-co-located (QCL); and
- performing, based at least in part on the one or more RSs, beam management for communication via the second frequency range.

30. The method of claim 29, wherein the set of beams of the second frequency range cover a full spatial dimension of the beam of the first frequency range.

* * * * *